United States Patent Office 2,791,182
Patented May 7, 1957

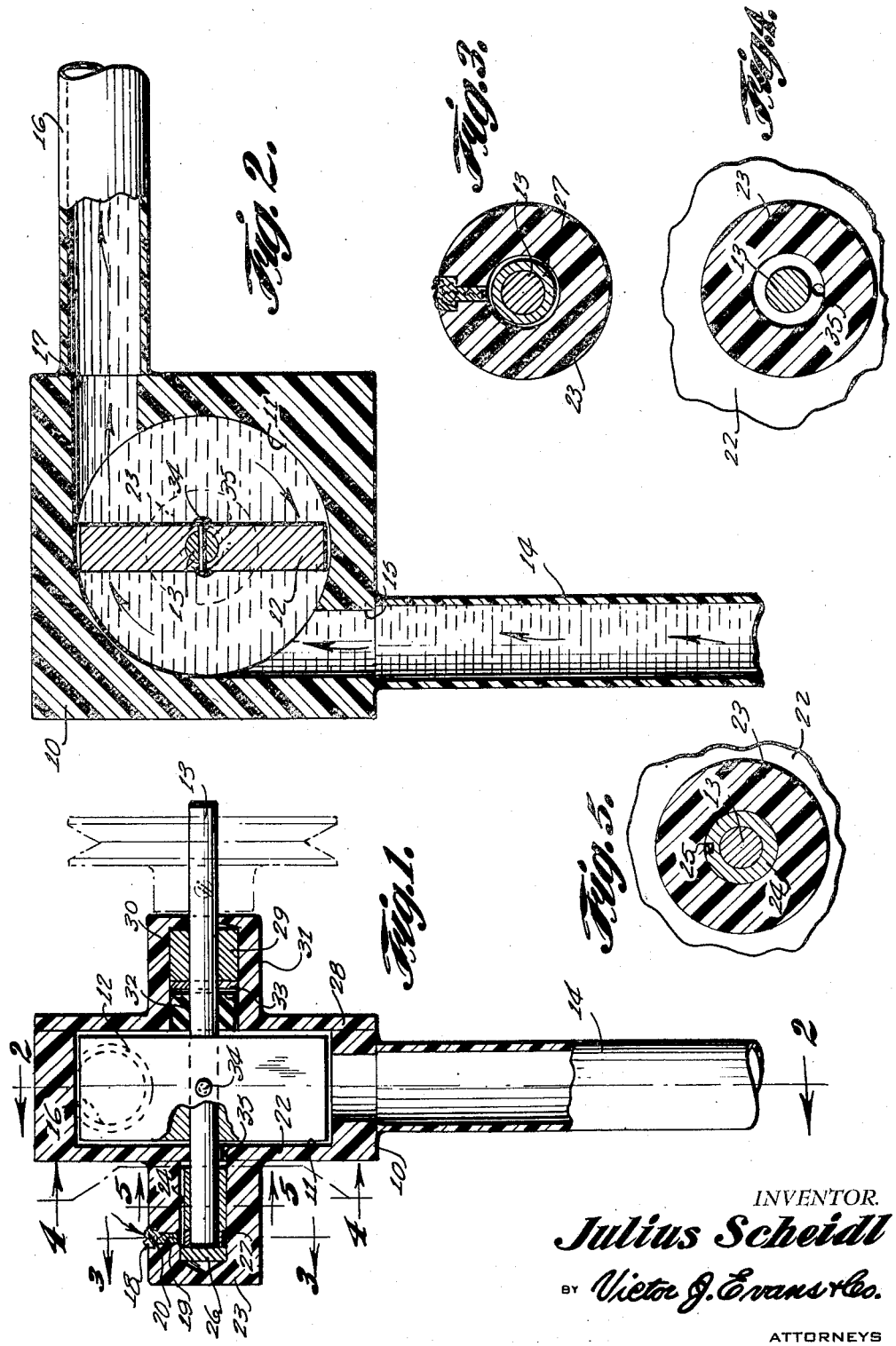

2,791,182

WATER AERATING PUMP

Julius Scheidl, Montgomery, Ala.

Application August 11, 1954, Serial No. 449,084

4 Claims. (Cl. 103—96)

This invention relates to aerating devices for charging water with air particularly for supplying water to fresh water and marine aquariums in combination with a filter to filter and aerate the water, and in particular, a rotary pump having a suction extended to a supply of fresh water and a discharge leading to an aquarium or the like, and in which a regulated valve is provided through which air is drawn through the rotor of the pump so that water being driven by the pump is charged with air.

The purpose of this invention is to provide an aerating device to be used in combination with a pump in which all possibility of water being driven by the pump being charged with toxic gases is eliminated.

Most metals, and particularly copper, are dangerous to most tropical fish and for this reason conventional water pumps are not used for supplying water to aquariums and the like. With this thought in mind, this invention contemplates a pump in which the housing and rotor, or blades thereof, are made of plastic and the shaft, key or pin, are of stainless steel whereby only the bearings are made of bronze and as the bearings do not come in contact with water passing through the pump there is very little possibility of the water being charged with poisonous gases from the bearings.

The object of this invention is, therefore, to provide means for forming a pump for supplying water to aquariums and the like in which the water is charged with air and in which there is very little possibility of poisonous gases from metals of the pump being carried into the water.

Another object of the invention is to provide aerating means in a pump for supplying water to aquariums and the like in which the amount of air with which the water is charged is regulated.

A further object of the invention is to provide an aerating pump for charging water supplied to aquariums with air in which the pump is of a simple and economical construction.

With these and other objects and advantages in view, the invention embodies a rotary pump comprising an impeller carried by a stainless steel shaft with the impeller and housing of the pump made of plastic and with the shaft rotatably mounted in the housing with bronze bearings, one of which is provided with an air passage through which air for charging water passing through the pump passes.

Other features and advantages of the invention will appear from the folowing description taken in connection with the drawing, wherein:

Figure 1 is a longitudinal section through the pump with part of an impeller carried by a shaft rotatably mounted therein shown in elevation and with a pulley by which the impeller may be driven by a belt shown in broken lines on the end of the shaft.

Figure 2 is a cross section through the pump being taken on line 2—2 of Figure 1.

Figure 3 is a cross section taken on line 3—3 of Figure 1 showing an air-regulating valve through which air for charging water passing through the pump is drawn through one of the bearings thereof.

Figure 4 is a cross section taken on line 4—4 of Figure 1 showing an opening for admitting aerated air to the pump housing in a wall of the housing.

Figure 5 is a cross section taken on line 5—5 of Figure 1 showing a bearing bushing with a groove therein through which air may pass through the bearing.

Referring now to the drawing wherein like reference characters denote corresponding parts, the improved aerating pump of this invention includes a housing 10 having a cylindrical opening 11 therein, an impeller 12 positioned in the opening 11 and mounted on a shaft 13, a suction tube 14 extended from one side of the housing and being in communication with a passage 15 in the housing, a discharge tube 16 extended from the outlet side of the housing and being in communication with a passage 17 in the housing, and an air-inlet valve 18 having an opening 19 with a counter-bore 20 in which the opening and counter-bore are packed with cotton or felt, as indicated by the numeral 21.

One side of the housing 10 is closed with a wall 22 from which a hub 23 extends and, as shown in Figure 1, the hub is provided with a or having a bronze-bearing bushing 24 therein which a longitudinally disposed groove 25 is positioned.

A thrust washer 26 is provided at the end of the shaft 13 extended through the bushing 24 and into the hub 23 and a retaining ring 27 is provided on the shaft whereby the impeller 12 is retained in alignment with the center of the housing and the opening 11 thereof.

The opposite side of the housing is closed with a wall 28 and a bronze-bearing bushing 29, through which the shaft 13 extends, is mounted in an opening or bore 30 in a boss 31 extended from the plate forming the wall 28. The side of the pump on which the boss 31 is positioned is also provided with an air seal 32 and a felt washer 33.

The impeller 12, which may be of any suitable type or design is secured to the shaft 13 with a pin 34 and with the impeller formed of a suitable plastic and the pin 34 and shaft 13 of stainless steel water passing through the pump, not being in contact with the bronze bushings 24 and 29, contacts only plastic and stainless steel and the possibility of oxidizing gases such as may result from copper and other metals being carried with the water is substantially obviated.

The quantity of air being drawn through the valve 18 and bearing and passing into the pump through an opening 35 in the wall 22 is regulated by the cotton or felt as with the material packed the volume of air drawn therethrough will be reduced and with the material loose the volume of air drawn into the pump will be increased.

The plate forming the wall 28 may be secured to the body of the housing by suitable means, and the impeller with the shaft 13 may be rotated by a belt or the like from a motor or other driving means.

It will be understood that modifications, within the scope of the appended claims, may be made in the design and arrangement of the parts without departing from the spirit of the invention.

What is claimed is:

1. In an aerating pump, the combination which comprises a plastic pump housing having a cylindrical opening therein and having a hub extended from one side and a boss, aligned with the hub, extended from the opposite side, said housing having inlet and discharge connections, bearing bushings in the hub and boss, a shaft extended through the cylindrical opening of the housing with one end extended through the boss and the other into the hub, an impeller mounted on the shaft and positioned in the cylindrical opening in the housing, a pin extended through the impeller and shaft for keying the impeller to the shaft, said hub having an air inlet opening therein and said housing having an opening providing communicating means between the bearing in the hub and cylindrical opening in the housing, and restricting means in said air inlet opening for regulating the air being drawn into the pump.

2. In an aerating pump, the combination which comprises a plastic pump housing having a cylindrical opening therein and having a hub extended from one side and a boss, aligned with the hub, extended from the opposite side, said housing having inlet and discharge connections, bearing bushings in the hub and boss, a shaft extended through the cylindrical opening of the housing with one end extended through the boss and the other into the hub, an impeller mounted on the shaft and positioned in the cylindrical opening in the housing, a pin extended through the impeller and shaft for keying the impeller to the shaft, said hub having an air inlet opening therein and said housing having an opening providing communicating means between the bearing in the hub and cylindrical opening in the housing, and restricting means in said air inlet opening for regulating the air being drawn into the pump, said impeller being plastic, said shaft and pin being of stainless steel, and said bearings being bronze and provided with sealing elements.

3. A water aerating pump comprising a plastic housing with a cylindrical opening therein and with intake and discharge connections communicating with the cylindrical opening and extended from the housing, a closed cylindrical hub having a bore therein extended from one side of the housing, a boss having a bore therein extended from the opposite side of the housing and aligned with the cylindrical hub, bronze bearing bushings positioned in the hub and boss, a shaft extended through said bronze bearing bushings and extended from the end of the boss, a plastic impeller, rectangular shaped in cross section, mounted on and secured to said shaft, said bronze bearing bushing positioned in the hub having a longitudinally disposed groove in the outer surface thereof, said hub having an opening with restricting means therein extended from the groove of the bronze bearing bushing to the peripheral surface of the hub, the wall of the housing positioned between the hub and cylindrical opening in the housing having an opening therethrough in registering relation with the longitudinally disposed groove of the bronze bearing bushing, said opening providing communicating means between the groove of the bronze bearing bushing and interior of the cylindrical housing whereby upon rotation of the impeller air is drawn through the opening of the hub, groove in the bronze bearing bushing, and opening in the inner wall of the housing into the cylindrical opening in the housing, and an air seal positioned in the bore of the boss and between the bronze bearing bushing in the boss and cylindrical opening of the housing.

4. A pump comprising a plastic housing with a cylindrical opening therein and with intake and discharge connections, said connections being positioned to form a right angle with the corner replaced with an arcuate surface and said connections being positioned whereby inner surfaces thereof on the outer sides of the connections are tangent to the periphery of the cylinder in the housing, said housing having a boss extended from one end and a hub extended from the opposite end, a shaft extended through the cylinder of the housing with one end positioned in the hub and the opposite end extended through the boss, bearing bushings in the hub and boss, a thrust collar positioned in the hub and mounted to be engaged by the end of the shaft providing a thrust washer, said boss having an angular plastic ring extended around the shaft and positioned against the inner surface of the opening of the boss, said hub having an air inlet opening extended therethrough with the opening providing communicating means between the atmosphere and an opening in which the end of the shaft is positioned, a filtering element in said air inlet opening restricting the flow of air therethrough, said boss having a channel extended from the air inlet opening into the interior of the housing, an impeller rectangular-shaped in cross section and mounted to rotate in the cylindrical opening of the housing, and means for securing the impeller to the shaft.

References Cited in the file of this patent
UNITED STATES PATENTS

| | | |
|---|---|---|
| 561,126 | Pendleton | June 2, 1896 |
| 1,460,982 | Records | July 3, 1923 |
| 1,969,881 | Gardner | Aug. 14, 1934 |
| 2,175,470 | Kice | Oct. 10, 1939 |
| 2,594,793 | Muerle | Apr. 29, 1952 |
| 2,684,034 | Roth | July 20, 1954 |
| 2,690,131 | Butler | Sept. 28, 1954 |
| 2,703,922 | Branchler et al. | Mar. 15, 1955 |

FOREIGN PATENTS

| | | |
|---|---|---|
| 657,148 | Great Britain | Sept. 12, 1951 |
| 662,105 | Great Britain | Nov. 28, 1951 |